United States Patent
Jalan et al.

(10) Patent No.: US 10,630,784 B2
(45) Date of Patent: *Apr. 21, 2020

(54) FACILITATING A SECURE 3 PARTY NETWORK SESSION BY A NETWORK DEVICE

(71) Applicant: A10 NETWORKS, INC., San Jose, CA (US)

(72) Inventors: Rajkumar Jalan, Saratoga, CA (US); Gurudeep Kamat, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/027,051

(22) Filed: Jul. 3, 2018

(65) Prior Publication Data

US 2018/0316767 A1 Nov. 1, 2018

Related U.S. Application Data

(63) Continuation of application No. 14/859,129, filed on Sep. 18, 2015, now Pat. No. 10,027,761, which is a continuation-in-part of application No. 14/268,914, filed on May 2, 2014, now Pat. No. 10,038,693.

(60) Provisional application No. 61/819,417, filed on May 3, 2013.

(51) Int. Cl.
*G06F 15/16* (2006.01)
*H04L 29/08* (2006.01)
*H04L 29/06* (2006.01)

(52) U.S. Cl.
CPC ........ *H04L 67/141* (2013.01); *H04L 63/0892* (2013.01); *H04L 63/1458* (2013.01); *H04L 63/1466* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 8,769,265 B1* | 7/2014 | Hughes | H04L 63/0823 713/156 |
| 2004/0098620 A1* | 5/2004 | Shay | H04L 63/02 726/13 |
| 2012/0227088 A1* | 9/2012 | Gao | H04L 63/126 726/3 |
| 2013/0298201 A1* | 11/2013 | Aravindakshan | H04L 63/0272 726/4 |

(Continued)

*Primary Examiner* — Phyllis A Book
(74) *Attorney, Agent, or Firm* — Keith Kline; The Kline Law Firm PC

(57) ABSTRACT

Facilitation of secure network traffic over an application session by an application delivery controller is provided herein. A method for secure network traffic transmission over an application session may include receiving, from a client device, a SYN data packet intended for an application server. The method may continue with determining, based on the SYN data packet, that the client device is a trusted source. The method may further include transmitting, based on the determination that the client device is the trusted source, a SYN/ACK packet to the client device. The SYN/ACK packet may include information for the client device to authenticate the client device to the application server directly as the trusted source.

20 Claims, 9 Drawing Sheets

(56) References Cited

U.S. PATENT DOCUMENTS

2014/0189093 A1* 7/2014 du Toit ................... H04L 47/10
709/224
2014/0373138 A1* 12/2014 Park ........................ H04L 63/08
726/22
2015/0215436 A1* 7/2015 Kancherla ........... H04L 63/1458
709/219

* cited by examiner

FACILITATING A SECURE 3 PARTY NETWORK SESSION BY A NETWORK DEVICE

CROSS-REFERENCE TO RELATED APPLICATIONS

The present application is a continuation of U.S. Nonprovisional patent application Ser. No. 14/859,129, filed Sep. 18, 2015, titled "Facilitating a Secure 3 Party Network Session by a Network Device," which is a continuation-in-part of, and claims the priority benefit of, U.S. Nonprovisional patent application Ser. No. 14/268,914, filed May 2, 2014, titled "Facilitating Secure Network Traffic by an Application Delivery Controller," which in turn claims the priority benefit of U.S. Provisional Application Ser. No. 61/819,417, filed May 3, 2013, titled "Facilitating Secure Network Traffic by an Application Delivery Controller". This application is also related to U.S. Nonprovisional patent application Ser. No. 14/261,322, filed Apr. 24, 2014 and titled "Systems and Methods for Network Access Control," and to U.S. patent application Ser. No. 13/791,760 titled "Application Delivery Controller and Global Server Load Balancer" filed on Mar. 8, 2013. All of the disclosures of the above applications are hereby incorporated by reference in their entireties, including all references cited therein.

FIELD OF THE INVENTION

The present disclosure relates generally to data processing, and more specifically to mechanisms that may be employed by an Application Delivery Controller (ADC) to prevent a denial of service attack in various network configurations.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter The present technology is directed to approaches for secure network traffic transmission over an application session. An exemplary method for secure network traffic transmission over an application session may include receiving, by an ADC, from a client device, a synchronization (SYN) data packet intended for an application server. The method may continue with determining, by the ADC, based on the SYN data packet, that the client device is a trusted source. The method may further include transmitting, by the ADC, based on the determination that the client device is the trusted source, a SYN/acknowledgement (ACK) packet to the client device. The SYN/ACK packet may include information for the client device to authenticate the client device to the application server directly as the trusted source.

The ADC may include a processor and a memory for storing instructions executable by the processor. The processor may be configured to receive, from a client device, a SYN data packet intended for an application server. The processor may be further configured to determine, based on the SYN data packet, that the client device is a trusted source. The processor may be further configured to transmit, based on the determination that the client device is the trusted source, a SYN/ACK packet to the client device. The SYN/ACK packet may include information for the client device to authenticate the client device to the application server directly as the trusted source.

Additional objects, advantages, and features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not limitation, in the figures of the accompanying drawings, in which like references indicate similar elements.

DETAILED DESCRIPTION

Figure 1:
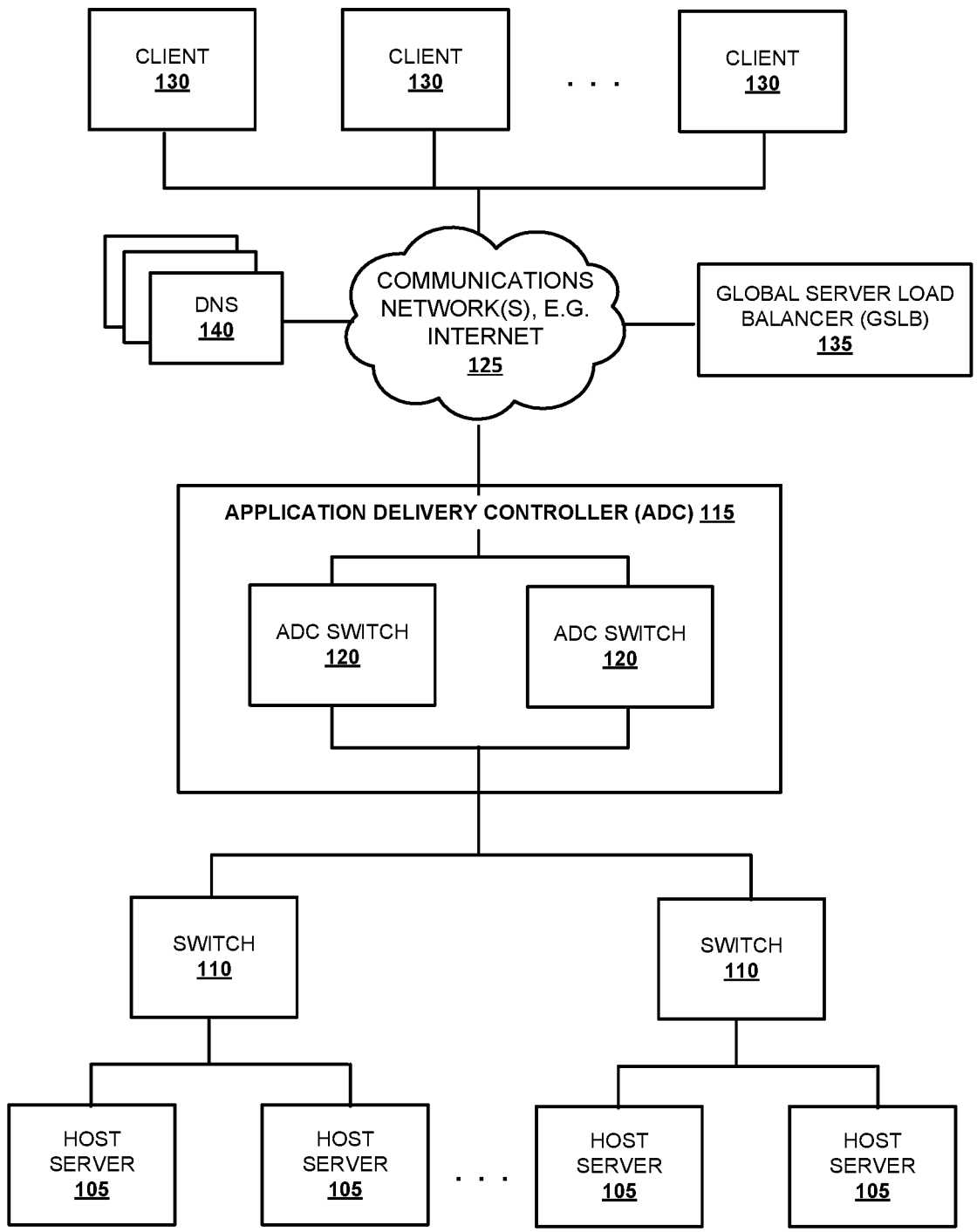
FIG. 1 is a block diagram of an exemplary symmetric network suitable for implementing one or more methods of the present disclosure.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present disclosure relates generally to data processing, more specifically to mechanisms that may be employed by an Application Delivery Controller (ADC) to prevent a denial of service attack in various network configurations.

Websites, web and mobile applications, cloud computing, and various web and mobile services have been rising in popularity. Some examples of fast growing consumer services include smart phone applications, location based services, navigation services, e-book services, video applications, music applications, Internet television services, and so forth. Subsequently, more and more servers are deployed within data networks including the Internet to accommodate the increasing computing and data storage needs. These servers are typically arranged in data centers or web farms, which may include ADCs, GSLB and/or server load balancers (SLBs).

In TCP/IP networks, one method of establishing a connection between two network devices such as a client device and a server, is through the use of a SYN packet, also sometimes referred to as a SYN flag. In this scenario, the client device that wishes to establish the connection first sends a SYN packet to the server. The SYN packet may comprise information within it such as the source IP address, source port, destination IP address, destination port, timestamp, maximum segment size, window scale, a sequence number for the connection, and other types of information.

Once the server receives the SYN packet, it typically responds with a SYN/ACK (or SYN acknowledgement) to acknowledge receipt of the SYN packet and the request to establish a connection. Upon receipt of the SYN/ACK, the client device typically responds with an acknowledgement ACK packet (the authentication acknowledgement), and the network connection is established, such that the two devices can now send data back and forth over the network. Typically, before the connection has actually been established, the server creates a session entry when it receives the SYN packet and keeps track of the information in the client's SYN packet for the connection (source and destination ports, source and destination IP addresses, timestamp, window scale, sequence number, and so forth).

However, this type of connection is vulnerable to a SYN attack. In a typical SYN attack, the server gets overwhelmed by SYN packets coming in at a faster rate than it can process them. This may lead to a denial of service response by the server, because the server is overwhelmed by the sheer number of SYN packets it receives. Because the server doesn't have enough resources to respond to all of the requests, the server may become unable to respond to any of the requests.

To help protect against these types of attacks, a server may utilize a SYN-cookie. When the server receives a SYN packet from a client device, it may generate a SYN-cookie that contains values based on the information in the original SYN packet. If the client device is a legitimate device and not a botnet, it will return to the server an ACK data packet, or authentication acknowledgement data packet, which contains the information from the SYN-cookie. The server then validates the sequence number and/or other information with the SYN-cookie and re-computes the original values from the SYN packet such as the client device's sequence number, window size, timestamp, maximum segment size, and so forth. The server does not create a session entry for the connection until it receives the ACK packet, thus preventing a botnet from overwhelming a server and taking it down by sending SYN packets.

Conventionally, an ADC is a network device disposed in a datacenter and part of an application delivery network (ADN). The ADC may allow performing common tasks, normally done by web servers, in an effort to remove some load from the web servers. ADCs are typically placed between the firewall/router and the host (web) servers. In addition, conventional ADCs may include various features providing for compression, caching, connection multiplexing, application layer security, and content switching. These features may be combined with basic server load balancing, content manipulation, advanced routing strategies, and highly configurable server health monitoring.

Additionally, ADCs may manage load balancing and delivery of service sessions from client host computers to servers based at least in part on incoming service requests. As more servers are deployed, additional ADCs may be deployed. Similarly, as more servers are pooled together within the data center or spread across multiple data centers to provide scalability, ADCs may become bottlenecks slowing data transmissions between devices on the network.

Because the ADC network device is typically placed between the firewall/router and the host (web) server, it may also be utilized for screening to ensure that the client host computer requesting to connect with the server is from a trusted source. However, routing all network traffic to and from the host servers through the ADCs may cause the ADCs to become a bottleneck. To prevent this from happening and to ease some of the burden on the ADCs, an "asymmetric" network, also referred to as "direct server return" configuration may be deployed. In this configuration, the client device's request for services may be forwarded to the server once the server device has been selected, but the response from the server may be sent directly to the client instead of being routed back through an ADC.

Deploying an ADC in such a TCP/IP network means that three devices must now communicate with each other. In order to send and receive data, the client device, ADC, and server need to maintain the sequence numbers for the connection. In a symmetric network configuration, the ADC can function as the intermediary between the client device and server; it can establish a two-way connection between itself and the client, and also another two-way connection between itself and the server. In this way, the ADC can facilitate the transfer of data back and forth between the client device and server. However, in an asymmetric network configuration, the ADC does not receive the traffic back from the server, and thus cannot serve as the intermediary. Therefore, the ADC needs to pass along the parameters from the client's SYN packet to the server, such that when the server sends back response data, it maintains the same characteristics contained in the original SYN and SYN/ACK packets including, but not limited to, sequence numbers, maximum segment size, window scale, timestamp, etc.

Embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices like FPGA's, or various combinations thereof. In particular, the methods described herein may be implemented by a series of computer-executable instructions residing on a storage medium such as a disk drive, or computer-readable medium. It should be noted that methods disclosed herein can be implemented by a computer, e.g., a desktop computer, server, tablet computer, laptop computer, smartphone and so forth.

The present technology provides various methods for operation of ADCs in data networks such as the Internet including a plurality of switches, routers, virtual switches, web farms, host servers, and other units. The present technology provides enhanced performance and security of ADC and allows implementing scalable business solutions for any services, applications, clouds and organizations. Furthermore, the present technology provides a scalable, high-performance application networking platform, which delivers superior reliability, security, and energy efficiency at lower total cost of ownership. ADC can also provide increased infrastructure efficiency, a faster end user experience, comprehensive Layer 4-7 feature set and flexible virtualization technologies such as Virtual Chassis System, multi-tenancy, and more for public, private and hybrid cloud environments. The ADC may include software and/or hardware components/platforms that may vary depending on a particular application, performance, infrastructure, network capacity, data traffic parameters, and so forth. A more detailed explanation of an exemplary method of ADC operation is described in U.S. utility patent application Ser. No. 13/791,760, filed on Mar. 8, 2013, titled "Application Delivery Controller and Global Server Load Balancer" which is hereby incorporated herein by reference in its entirety including all references cited therein.

The present technology further provides various systems and methods for operation of a service on a network. It provides technology to identify viruses, botnets, trojans, malware, and other type of unauthorized services from accessing and overwhelming a host server providing the service. These systems and methods may be used to prevent a denial of service attack on a network device.

Turning now to FIG. 1, a high-level block diagram of a network topology 100 suitable for implementing one or more methods of the present disclosure is shown. The network topology 100 shown by FIG. 1 may include a number of host servers 105, a number of switches 110 combining/coupling the host servers 105 and thus performing Layer 2 aggregation and corresponding switching. The topology 100 may further include an ADC 115 including one (or more) ADC switches 120, which may employ one or more of the methods disclosed herein. As will be appreciated by those skilled in the art, the ADC switches 120 may operate in different modes, such as standalone, active/standby mode, backup mode, active-active and others, depending on an application.

Still referring to FIG. 1, the topology 100 may further include a communications network 125, which may refer to, for example, the Internet, Local Area Network (LAN), Wide Area Network (WAN), Internet, a cellular network, a telephone network, or any other switched network or their combinations. There is also a plurality of clients 130, which may include end user computers, mobile phones, thin clients, and so forth. There are also one or more Local DNS Servers which may be associated with one or more clients 130 and/or one or more host servers 105. As shown in FIG. 1, the topology may include a GSLB 135, which may also employ one or more of the methods disclosed herein.

Generally speaking, load balancing is a technique that may be used for distributing the workload evenly across clients 130, networks 125, host servers 105, and other networked resources. The load balancing may enhance utilization of resources and enable maximize throughput with minimum response time, hence avoiding overloading of a single server.

A typical data packet in a TCP/IP network, may be comprised of a data component and one or more header components. The header may comprise a layer 2 header, layer 3 header, layer 4 header, or any other necessary components for transmitting the packet. The layer 2 header may comprise information such as a destination MAC address, source MAC address, and Ethernet type. The layer 3 header may be an IP header, and the layer 4 header may be a TCP header.

The IP header may comprise identifying information such as the source IP address from which the packet originated, the destination IP address for the packet, and other IP options. The IP options in the IP header may comprise information that describes the packet, directs the packet to take a particular route to reach the destination, information regarding policies for the packet, experimental fields, and any other attribute. The IP options may be defined by a type-length-value system whereby the first two bytes represent the option identification number, the next two bytes represent the length, and the remaining bytes represent the value (encoded information about the option itself).

The TCP header may comprise identifying information such as the source port from which the packet originated, the destination port for the packet, window, sequence number, ACK number, any flags (such as SYN flags), and other TCP options. Some examples of TCP options may include maximum segment size (MSS), window scale, selective ACK, timestamp, and other experimental options. The window scale may comprise a factor by which to multiply the window. Typically, the window scale may be any factor up to 15. Selective ACK messages may be used for selective retransmission of individual data packets that were not received at the destination. Timestamp may also be used to identify that the data being sent is from the same device by aligning the numerical values of the timestamp.

In certain embodiments, the ADC 115 may employ a SYN packet technique utilizing a SYN-cookie to verify that the client 130 is a trusted source and not a spoof, botnet, or any other unauthorized program. In an exemplary methodology, the client 130 may first send a SYN packet to the ADC 115, which may include a sequence number for communicating on a TCP/IP stack. The ADC 115 may then send a SYN/ACK to the client 130, comprising a SYN-cookie. The SYN-cookie may comprise a sequence number for the ADC 115, as well as an acknowledgement of the client's sequence number. The client may then respond with an acknowledgement of the SYN-cookie, thus authenticating that the client's connection request is legitimate. Once the client 130 has been authenticated, the ADC 115 may then forward data from the client to the host server 105.

In a stateless operating mode, the ADC 115 does not retain any information about the SYN packet until the final acknowledgement is received and the connection is established. This is to prevent a denial of service attack causing the ADC 115 to be overwhelmed with a flood of SYN packets. Furthermore, TCP options from the client 130 to the ADC 115 are typically exchanged in the first SYN packet, and the SYN/ACK, but are not exchanged again after the connection is established. Thus, the ADC 115 may encode the data from the TCP options received in the original SYN packet into the SYN-cookie that it sends with the SYN/ACK. A SYN-cookie typically contains four bytes of data, and thus TCP options such as MSS, window scale, and selective ACK may be encoded within those data bytes. When the client 130 receives the SYN/ACK with the SYN-cookie within it, the client 130 then transmits an acknowledgement back to the ADC 115 with a sequence number referring to the SYN-cookie. Thus, even though the ADC 115 does not retain the actual TCP options received in the original SYN packet while operating in a stateless mode, it may still have the relevant information necessary in the encoded SYN-cookie sequence numbers to re-compute those parameters to communicate on the connection.

Since the ADC 115 may be connected to a plurality of servers 105 at any given time, the ADC 115 may periodically probe the servers through a health check or any other methodology to determine which server to route the requests to. In one embodiment, the ADC 115 may probe the active servers 105 and calculate a lowest common denominator to present to the client 130. For example, if the ADC 115 probes three servers about their window scale capacity, and the servers have capacity for a window scale of five, seven, and ten, the ADC 115 may present a window scale of five to the client 130. Thus, regardless of which server the traffic is ultimately routed to, all servers will be able to handle at least that much traffic.

In exemplary embodiments, the ADC 115 may also comprise a translation layer. The translation layer may comprise information that is calculated and placed in the packet header to correlate the options in the packet header from the client with the options that the host server 105 has the capacity to serve. This is to maintain the proper protocols for communicating in the TCP/IP stack. When the ADC 115 routes a particular packet from a client 130 to a host server 105, it may adjust the values in the TCP header to match the parameters that the particular host server 105 has the capacity to serve. In this way, the protocols are aligned and communication between the network devices is streamlined. In certain embodiments, the translation layer may comprise a Layer 4 expanded SYN-cookie, Layer 4 metadata, Layer 3 metadata or any other mechanism for interfacing between the header options of the client 130 and the host server 105.

Figure 2:
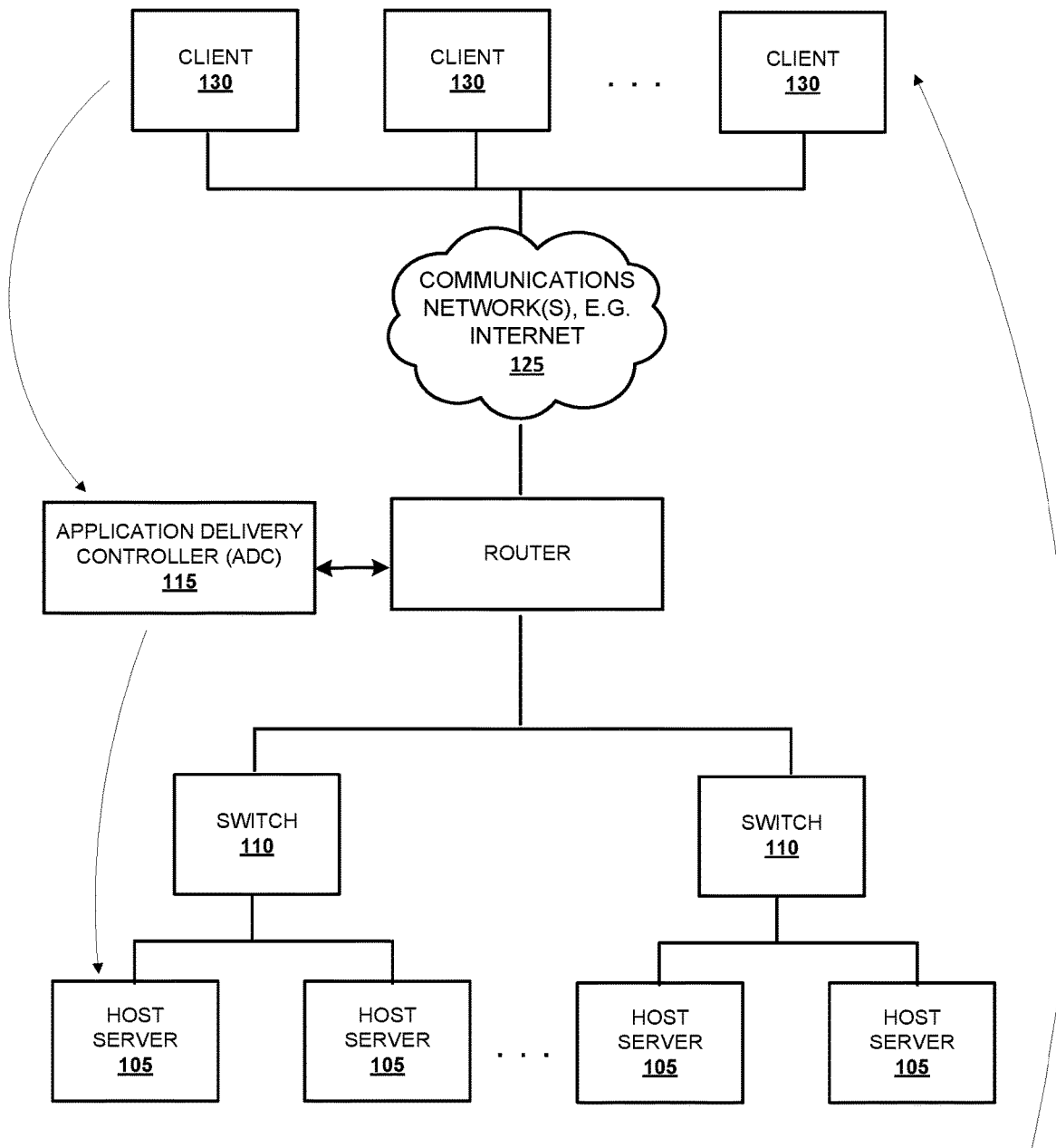
FIG. 2 is a block diagram of an exemplary asymmetric network suitable for implementing one or more methods of the present disclosure.

FIG. 2 illustrates a block diagram of an exemplary network topology 200 operating in an "asymmetric" or "direct server return" mode. In this mode, a client 130 may submit a request for services. The request is transmitted through the communications network 125 to the ADC 115. Once the ADC 115 can verify that the client is a trusted source and the request is legitimate using a SYN-cookie or any other verification method, the ADC 115 may forward the request to one or more host servers 105. The one or more host servers 105 may then return the data to the client 130, such that the ADC 115 does not become a bottleneck in the system 200.

To maintain the TCP connection between the client 130, ADC 115, and host servers 105, a change is needed to the host server's TCP stack. In a typical TCP/IP stack, the ADC 115 would request to connect to the host server 105 by sending it a SYN packet, and then being authenticated via a SYN-cookie, or any other such method. However, in the asymmetric mode, the ADC 115 begins communicating with the host server 105 by forwarding to it the authentication acknowledgement data packet (ACK packet) from the client such that it has all of the header options from the client 130.

Once the client 130 has been authenticated by the ADC 115, the data from the client 130 is transmitted directly to the server 105. However, the sequence numbers, TCP options, and other data in the packet from the client 130 that is forwarded directly to the server 105 contains references to data parameters that the server is not familiar with, since the authentication of the client 130 occurred prior to the data being transmitted to the server 105. Thus, in some embodiments, when the ADC 115 receives the acknowledgement from the client 130 referencing its SYN-cookie, the ADC 115 may then embed or stamp certain data onto the packet before forwarding it on to a server 105. The ADC 115 may embed data such as server sequence number, client MSS, client selective ACK, client window scale, client timestamp, or any other data found in the header, such that the processing information needed for the data packets from the client matches with the processing information needed for the packets from the server 105. In various embodiments, varying amounts of TCP option information may be embedded in the final ACK packet received from the client 130 before it is forwarded to the server 105.

In various embodiments, the ADC 115 may add TCP options to the ACK packet that it forwards to the server 105. The TCP options may include information such as window, MSS, timestamp, and so forth, or combinations thereof. The ADC 115 may accomplish this by adding one (1) TCP option for every parameter needed, or may simply use one TCP option with designated fields for each parameter. For example, the ADC 115 may designate one TCP option field of 64 bit length. The ADC 115 may use the first eight bits to represent the maximum segment size, the next 8 bits to represent the window size, etc.

When the server 105 receives the packet with the modified header information, it may recognize that the data packet and/or client 130 source has previously been authenticated by the ADC 115, and thus the server may automatically deem the data packet to be trusted and place it into the TCP stack for processing. In certain embodiments, the ADC 115 may only embed such information into the header of the initial packet forwarded to the server 105. In other embodiments, the ADC 115 may embed TCP option data into the header of all data packets it forwards to the server 105. In various embodiments, the TCP options and/or other information may be embedded onto the data packet forwarded by the ADC 115 to the server 105 through the use of an SDK that may be deployed by a network administrator for a server.

In other embodiments, the ADC 115 may add IP options to the ACK packet that it forwards from the client 130 to the server 105. The IP header of a data packet may include a fixed header and options fields. In one embodiment, the ADC 115 may use the IP options field(s) of the IP header to encode the relevant information necessary for the server 105 to communicate directly with the client 130, including the sequence numbers, timestamp, etc. The ADC 115 may accomplish this by adding one IP option for every parameter needed, or may simply use one IP option with designated fields for each parameter. For example, the ADC 115 may designate one IP option field of 64 bit length, and use eight bits to represent each of the various parameters.

In another embodiment, the ADC 115 may use the fixed header portion of an IP header. In the fixed header portion of an IP header of a data packet, there is an IP identification field. Typically, the IP identification field is two bytes in length, which allows 16 bits of encoded information. The ADC 115 may create an index table of $2^{16}$ different combinations of parameter values, or some other appropriately sized index table. After the client 130 has been authenticated, the ADC 115 may re-compute the original parameters from the client's original SYN packet, and then pick the most appropriate parameter combination from the options in the index table. Then, the ADC 115 may encode a value associated with that entry in the index table into the IP identification field of the fixed IP header, which is then added to the data packet forwarded to the server 105.

When the server 105 receives this data packet from the ADC 115, it may receive the value from the IP identification field of the fixed IP header on the data packet, look up this value in the index table, and from there extract the proper source information, destination information, sequence numbers, timestamp, and all other relevant parameters necessary for ensuring proper data transfer over the network.

The index table that the ADC 115 uses to encode a value into the IP identification field is the same index table that the servers 105 may use to decode the value. The table may be static, such that the parameters and their associated encoded values are fixed. Alternatively, the table may be dynamic, and the ADC 115 and servers 105 may synchronize their tables periodically. In various embodiments, each network device may maintain its own local copy of the index table that is periodically synchronized. Alternatively, the index table may be maintained in a network database, or any other data structure, that is accessible to any network device from any location in the network.

In another embodiment, the processing information needed by the server 105 may directly be placed by the ADC 115 in a network database, or any other data structure, that is accessible to any network device from multiple locations in the network. In this configuration, the server 105 may look up the processing information directly, without the ADC 115 being required to make modifications to the packets it sends to the servers.

In further embodiments, the ADC 115 may transfer the relevant connection parameters from the client's SYN packet to the servers 105 through an out of band mechanism. In these embodiments, the ADC 115 may utilize one channel to authenticate itself to the servers 105 and transfer information regarding the data flow to the servers such as the sequence numbers, timestamp, window size, and any other relevant parameter necessary for efficient data transfer over the network. The ADC 115 may then utilize a separate channel to forward the actual data packets from the client 130 to the servers 105. In this way, the ADC 115 may not need to alter the ACK packet or any other data packets it receives from the client 130 before forwarding to the server 105 for processing.

In various embodiments, the ADC 115 may utilize the first channel to transmit information about the upcoming data flow to the server 105 at the beginning of each data flow, periodically throughout the data flow, and/or at the end of the data flow.

In other embodiments, the ADC 115 may utilize IP tunneling to transfer the relevant information necessary to the servers 105 about the data. In these embodiments, the ADC 115 may not need to edit the ACK packet received from the client 130 before forwarding it to the server 105. The ADC 115 may instead utilize a module to place the ACK packet in another packet with an IP header that contains the relevant parameters, and then send this modified packet to the servers 105. When the server 105 receives the modified packet, it may extract from the modified packet's IP header the sequence number for the connection, timestamp, and all other relevant parameters necessary for proper data flow between the server 105 and the client 130. In various embodiments, the ADC 115 may utilize a tunnel header to communicate the relevant parameters. The ADC 115 may use a module to encapsulate the ACK packet from the client with data representing the relevant parameters. When the server 105 receives the modified packet, it may use a module to extract the outer header with the relevant parameters such that when it sends response data back to the client 130, it may do so with the proper sequence numbers, timestamp, window, and/or other parameters to communicate over the network protocol.

While the above methods have been described generally with a first packet being received by the server from the ADC as being the ACK packet that includes processing information (that is, information that is needed by the server for communicating with the client), it will be understood by those skilled in the art that the first packet received by the server from the ADC may not be the ACK packet, but could also be another SYN packet or some other packet in which the necessary processing information is embedded or otherwise communicated.

Figure 3:
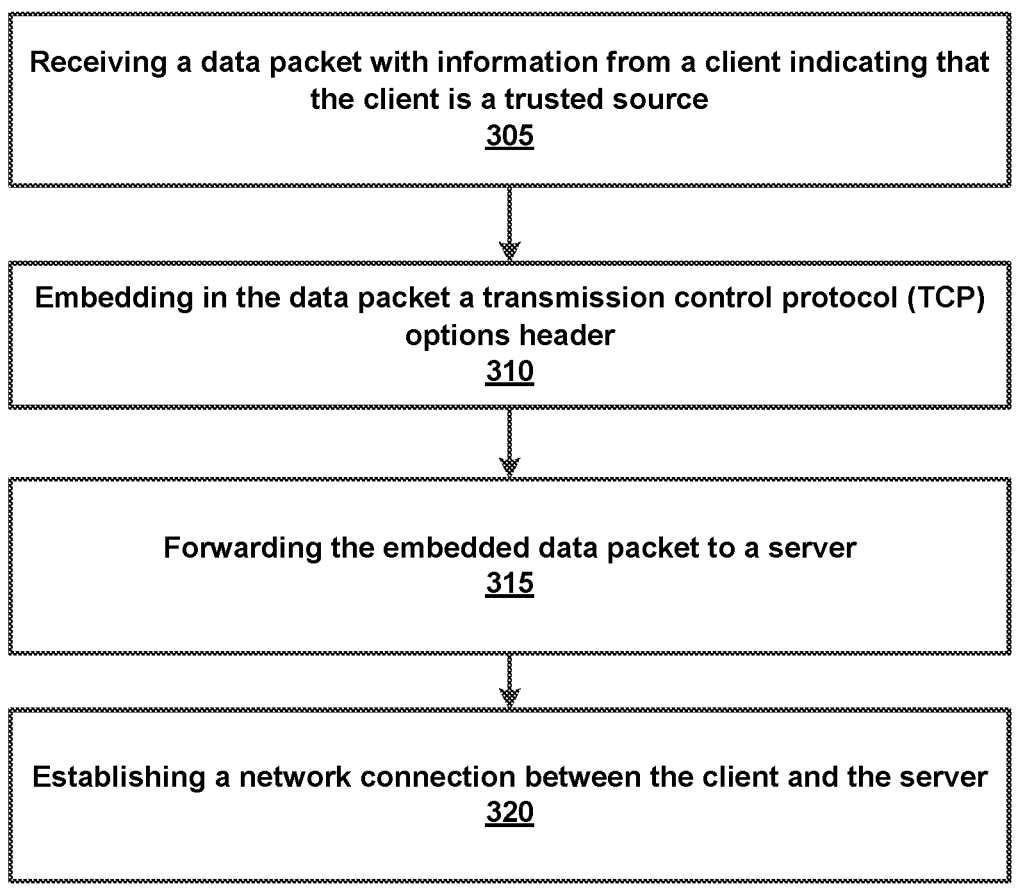
FIG. 3 is a flowchart of an example method for facilitating a secure network by a network device.

FIG. 3 illustrates a method for facilitating a secure network by a network device, such as the ADC described above. According to some embodiments, the method may include the ADC receiving 305 a data packet with information from a client indicating that the client is a trusted source. As mentioned above, the process of the client indicating that it is a trusted source may include a SYN, SYN/ACK, SYN-cookie, and final ACK exchange process as described above. The ADC mediates between the client and server in exchanging these messages so as to prevent malicious network activity by potentially malicious clients. For example, a malicious client may attempt to flood the network with SYN messages to cause a denial of service attack.

In furtherance of this goal, the method also further includes the ADC embedding 310 in the data packet a transmission control protocol (TCP) options header. In some embodiments the TCP options header comprises information including at least a sequence number for a protocol connection. The TCP options header can also include connection parameters, which include parameters that are necessary for efficient data transfer over the secure network. For example, a maximum segment size, a window scale, and a selective acknowledgement message, as well as other parameters that would be known to one of ordinary skill in the art with the present disclosure before them.

The method includes the ADC forwarding 315 the embedded data packet to a server, as well as establishing 320 a network connection between the client and the server.

While the example of FIG. 3 has been described with respect to an ADC, it will be understood that other network device such as routers, switches, firewalls, or other network devices can be also be configured to execute the methods described herein. That is, the technology described herein is not limited to being executed by an ADC.

Figure 4:
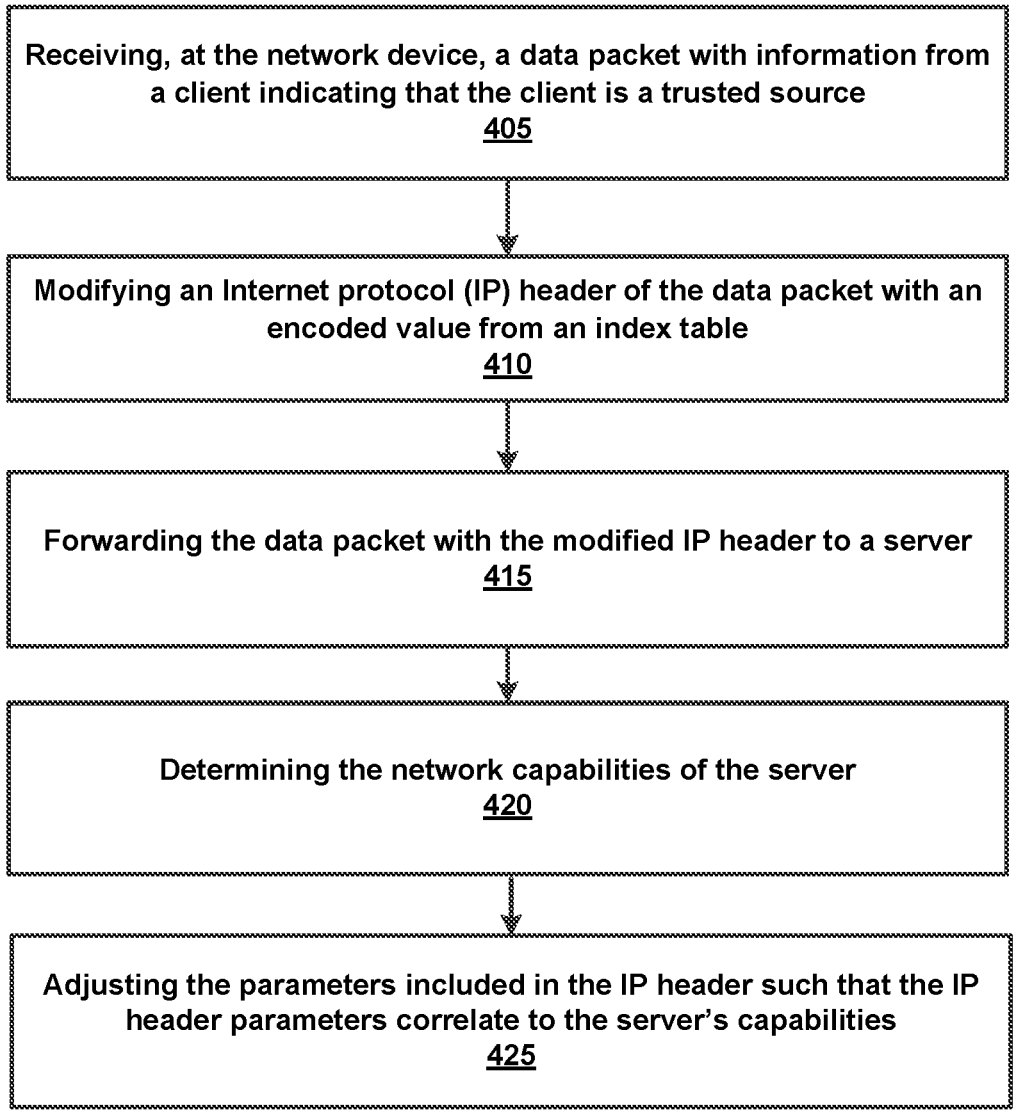
FIG. 4 is a flowchart of another example method for facilitating a secure network by a network device.

FIG. 4 illustrates another method for facilitating a secure network by a network device, such as the ADC described above. In general, this method is configured to use the IP header of a data packet, rather than the TCP options header. In this embodiment, the method includes the ADC receiving 405, at the network device, a data packet with information from a client indicating that the client is a trusted source. Again, this may include a SYN packet or an ACK message received from the client as specified in the examples provided supra.

Next, the method includes the ADC modifying 410 an Internet protocol (IP) header of the data packet with an encoded value from an index table. As with the method above, the encoded value may include a fixed header and options fields. The modification may include encoding parameters such as source information, destination information, sequence numbers, timestamp, as well as other network protocol parameters that would be known to one of ordinary skill in the art.

Once the IP header of the client's packet has been modified, the method includes forwarding 415 the data packet with the modified IP header to a server.

Optionally, the method may include determining 420 the network capabilities of the server and adjusting 425 the parameters included in the IP header such that the IP header parameters correlate to the server's capabilities. For example, if the IP header information includes protocol parameters that cannot be serviced by the server, the ADC can determine the capabilities of the server and adjust the parameters received from the client to ensure that the client and server are able to communicate with one another over the network in a secure manner.

Figure 5:
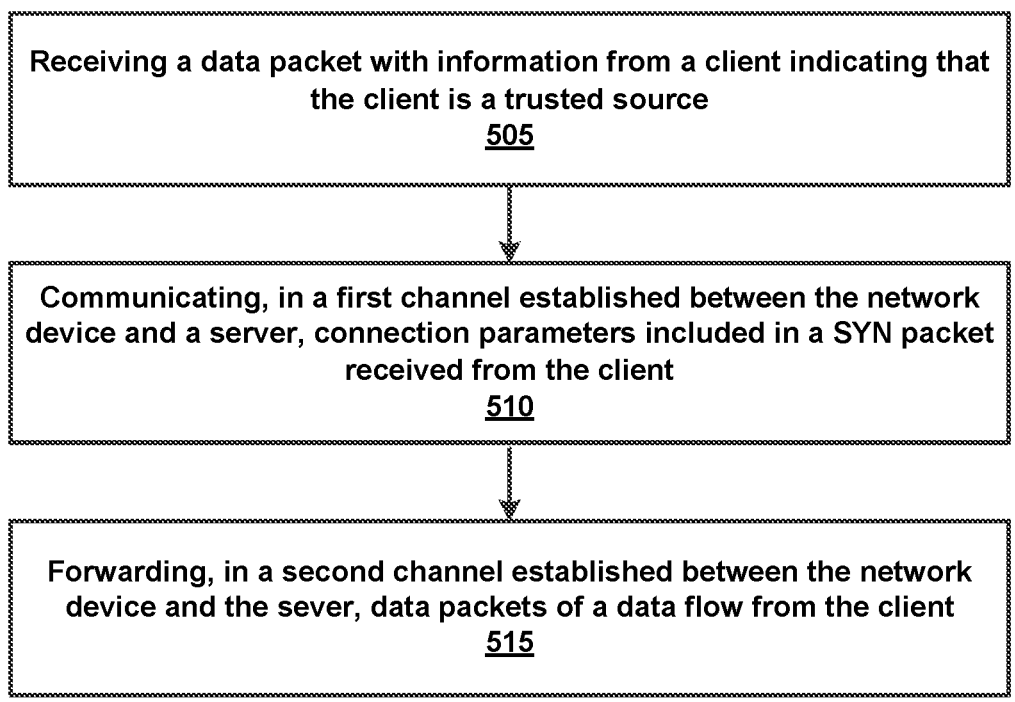
FIG. 5 is a flowchart of an example method for facilitating a secure network by a network device using in-band and out-of-band communication.

FIG. 5 illustrates a method for facilitating a secure network by a network device, where the network device is configured to use in-band and out-of-band channels for communicating with a server. The method may include receiving 505 a data packet with information from a client indicating that the client is a trusted source. Once the data packet is received, the method includes communicating 510, in a first channel established between the network device and a server, connection parameters included in a SYN packet received from the client. It will be understood that the connection parameters comprise, in some embodiments, to parameters included in a SYN packet received from the client. As with the other embodiments, the connection parameters comprise parameters necessary for efficient data transfer over the secure network. In some embodiments, the method includes forwarding 515, in a second channel established between the network device and the server, packets of a flow from the client.

As mentioned above, the ADC may also be configured to use IP tunneling as part of the in-band/out-of-band methodology.

Figure 6:
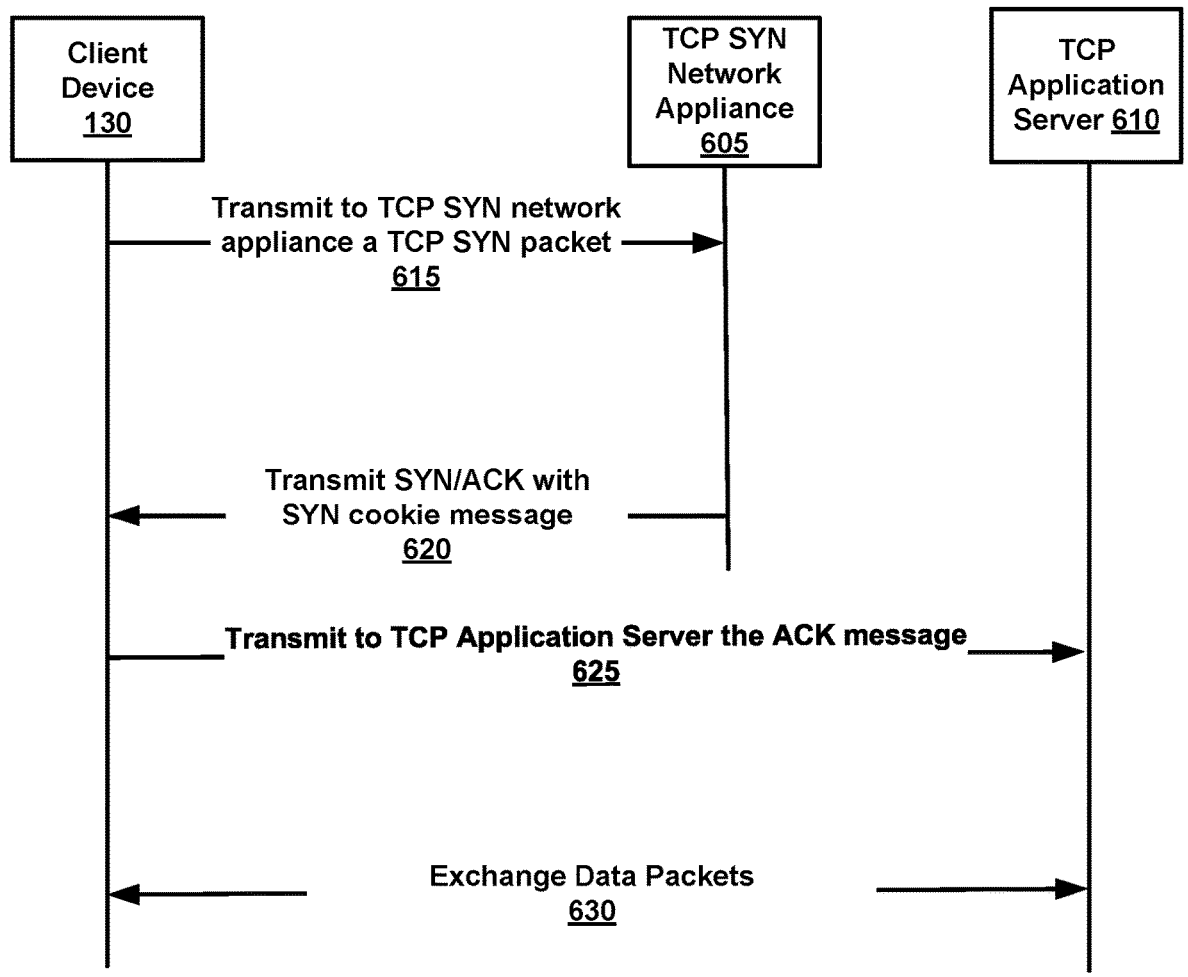
FIG. 6 is a signal flow diagram of an exemplary method for establishing a 3-party TCP session in a data network.

FIG. 6 illustrates an exemplary method for a 3-party TCP session setup in a data network. In the exemplary method, a client device 130 seeks to establish a TCP session with TCP application server 610. The 3 phase TCP connection is established by three different devices (client device 130, network application 605, and TCP application server 610).

In seeking to establish the session, client device 130 transmits a TCP SYN packet. The TCP SYN packet may be received by the TCP SYN network appliance 605. The TCP SYN network appliance 605 may be an ADC, firewall, network switch, network router, network computer, remote access server, host server, VPN gateway, or other network component, as discussed herein. In some embodiments, TCP SYN network appliance 605 is embedded into a network switch (e.g. an Ethernet switch) or a router. In other embodiments, TCP SYN network appliance 605 may be a network appliance dedicated to the processing of SYN packets.

In an example, the client device 130 transmits a TCP SYN packet prior to authentication on the network. Thus, to access a service on the network the client device 130 will transmit to the network a TCP SYN packet. The composition of the TCP SYN packet may be any single or composition of characteristics such as a sequence number, an IP address, a MAC address, IMEI, SSID, a source port, or any other identifying characteristic that can be used to identify an appliance on a network, as discussed herein.

The TCP SYN network appliance 605 receives the TCP SYN packet from client device 130 to initiate a TCP session in step 615. In response, the TCP SYN network appliance 605 sends a SYN/ACK message with a SYN-cookie to the client device 130 in step 620. The SYN-cookie may comprise a sequence number that identifies the TCP SYN network appliance 605, an ACK number acknowledging the sequence number from the SYN packet, and/or any other identifying information that is representative of TCP SYN network appliance 605. The SYN cookie may be stored on the client device 130.

In exemplary embodiments, an original TCP SYN packet from a client device 130 may have a sequence number (or other identifying information) that represents the client device 130. A SYN/ACK packet is returned to the client device 130 from the TCP SYN network appliance 605. This SYN/ACK message comprises the client's sequence number (as found in the original TCP SYN packet) plus one, and a sequence number that identifies the TCP SYN network appliance 605. An ACK packet/message (authentication acknowledge packet) is subsequently transmitted by the client device 130 and received by TCP application server 610 in step 625 to create a TCP session between client device 130 and TCP application server 610, based on the received ACK packet. The ACK packet may comprise information from the SYN-cookie, including the sequence number for the TCP SYN network appliance 605 plus one. The TCP application server 610 informs TCP application of the TCP session, and exchanges data packets with client device 130 using the network in step 630.

In this way, network application 605 facilitates the TCP connection between client device 130 and TCP application server 610, without directly handling the ACK packet back from the client device 130, and without needing to transmit information relating to the SYN cookie directly to TCP application server 610. In some embodiments, the SYN cookie is generated using server information sent by TCP application server 610 to TCP SYN network appliance 605. When TCP application server 610 receives the ACK packet from client device 130 which includes the SYN cookie information, TCP application server 610 can retrieve the server information used in generating the SYN cookie, thus eliminating the need for the server to request TCP SYN network appliance for information regarding the SYN cookie.

Figure 7:
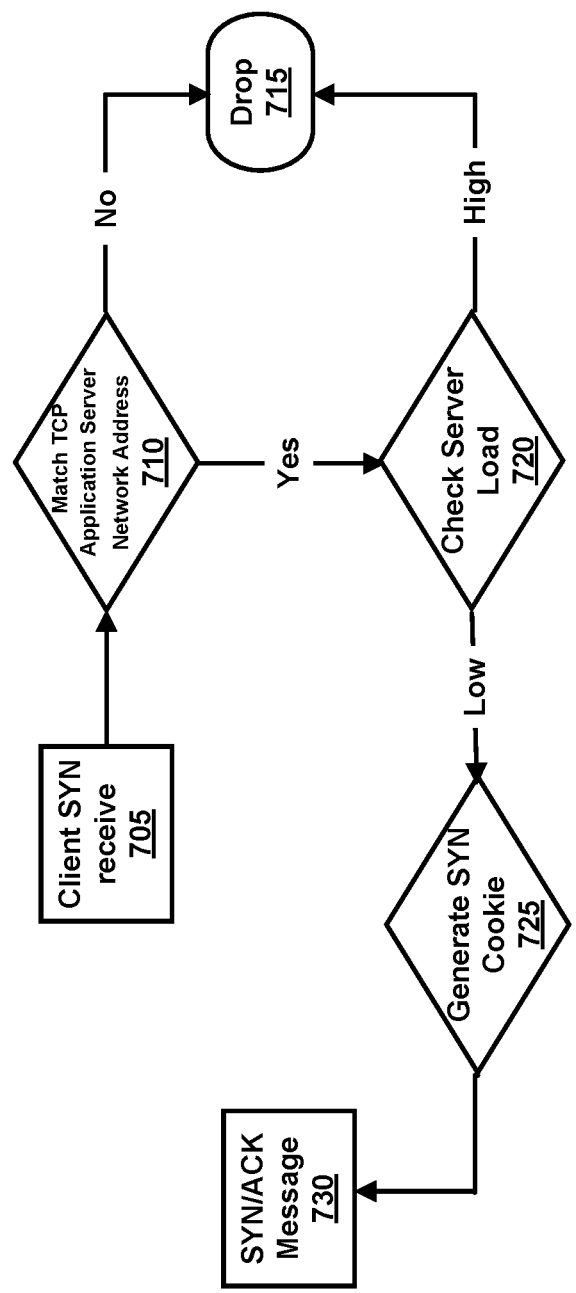
FIG. 7 is a flowchart of an exemplary method for generating a SYN/ACK message.

FIG. 7 illustrates an exemplary embodiment of a method for generating a SYN/ACK message by a TCP SYN network appliance 605. Generally, the process is initiated as above, with the TCP SYN network appliance receiving a TCP SYN packet from the client device in block 705. Next, the TCP SYN network appliance extracts a destination network address (i.e., IP address, port, etc.) from the TCP SYN packet, matches the destination network address to the network address of the TCP application server information, and determines if there is a match in block 710. If there is no match, the TCP SYN packet is dropped (or may be forwarded to another device)

in block 715. In some embodiments, if there is a match, TCP SYN network appliance receives TCP application server information from TCP application Server, network administrator, network manager, a network computer, or pre-set by a user. Next, the server load of TCP application server is checked to determine if TCP session request (TCP SYN packet) should be accepted in block 720. If the server load is high, TCP SYN network appliance stops processing and drops TCP SYN packet in block 715. If server load is low, TCP SYN network appliance accepts and continues processing TCP SYN packet. After continuing processing TCP SYN packet, the TCP SYN network appliance generates a TCP SYN cookie using TCP options, such as maximum segment size (MSS), window scale, selective ACK, timestamp, and other experimental options, in TCP application server information in block 725. If the TCP options are not in the TCP application server information, pre-set TCP options may be used. A SYN/ACK message is created using TCP SYN cookie and sent to the client in block 730.

Figure 8:
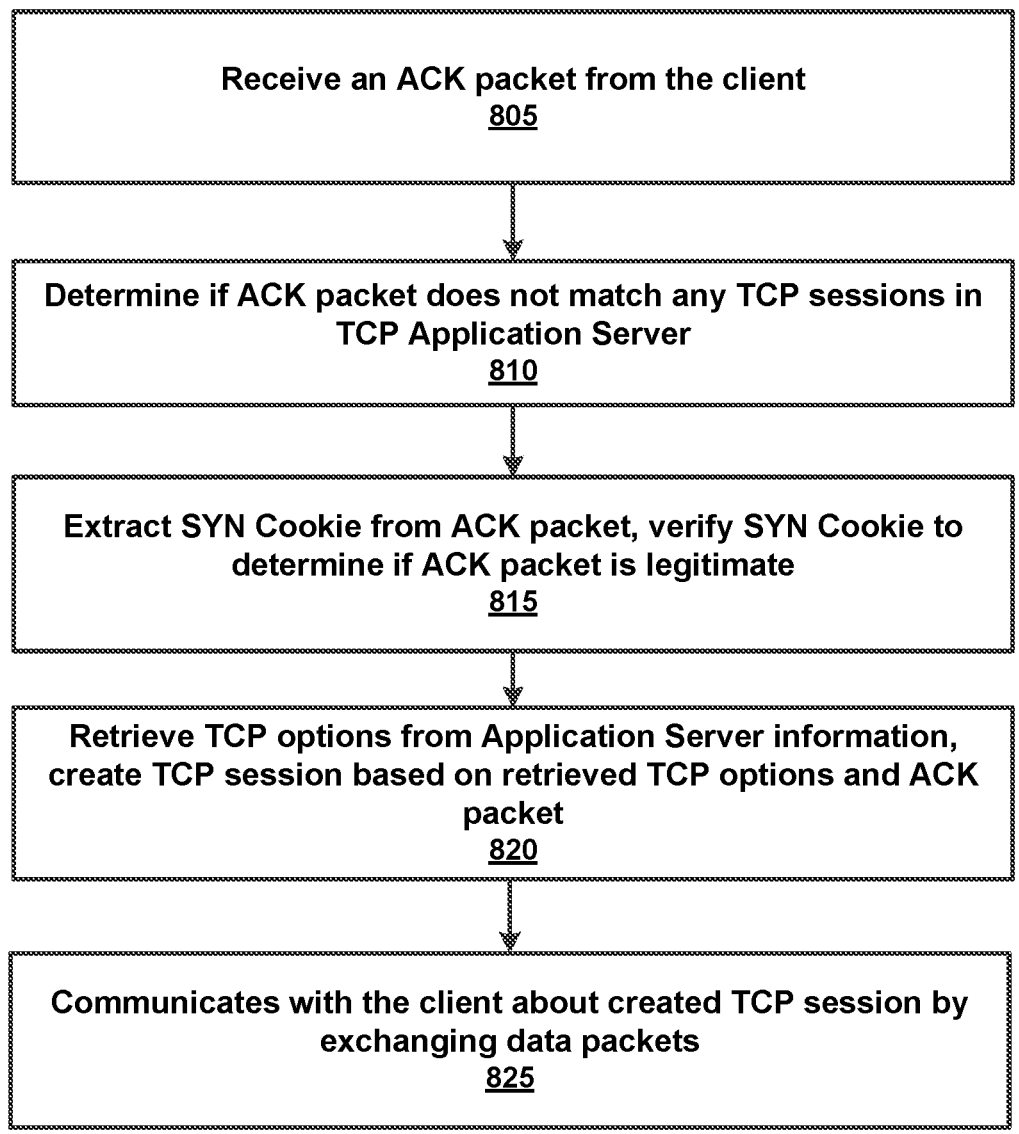
FIG. 8 is a flowchart of an exemplary method for establishing a TCP session.

FIG. 8 illustrates an exemplary embodiment of a method for establishing a TCP application session. The method may include the TCP application server receiving 805 an ACK packet from the client. In some embodiments, when the destination network address of the ACK packet is that of the TCP application server, the data network will forward the ACK packet to the TCP application server. In another embodiment, the TCP SYN Network Appliance receives the ACK packet, matches the destination network address of the ACK Packet to that of the TCP application server, and forwards the ACK packet to the application server. Next, the method may include the TCP application server determining 810 if the ACK packet does not match any TCP sessions currently in the TCP application server. The TCP application server extracts 815 the SYN cookie from the ACK packet and verifies the SYN cookie to determine if the ACK packet is legitimate. In some embodiments, the verification is based on TCP options in TCP application server information. The TCP application server retrieves 820 TCP options, such as MSS, window scale, selective ACK, timestamp, and other experimental options, from TCP application server information. In some embodiments, TCP application server information includes a plurality of TCP options, and TCP application server uses SYN cookie to select at least one of the plurality of TCP options. Next, TCP application server creates 820 a TCP Session based on the retrieved TCP options and the ACK packet. TCP application server notifies the application of the created TCP session, and the application communicates 825 with the client device 130 by exchanging data packets.

In particular embodiments, the TCP application server updates the server load information from time to time. Server load information may include CPU load, network module load, number of TCP sessions, application load, and an indication to accept or to decline SYN requests. TCP application server may determine TCP options based on pre-set values or values pre-configured by a user. In some embodiments, TCP application server sends TCP application server information to TCP SYN Network Appliance 605, at periodic intervals, or whenever there is a change to the information.

Figure 9:
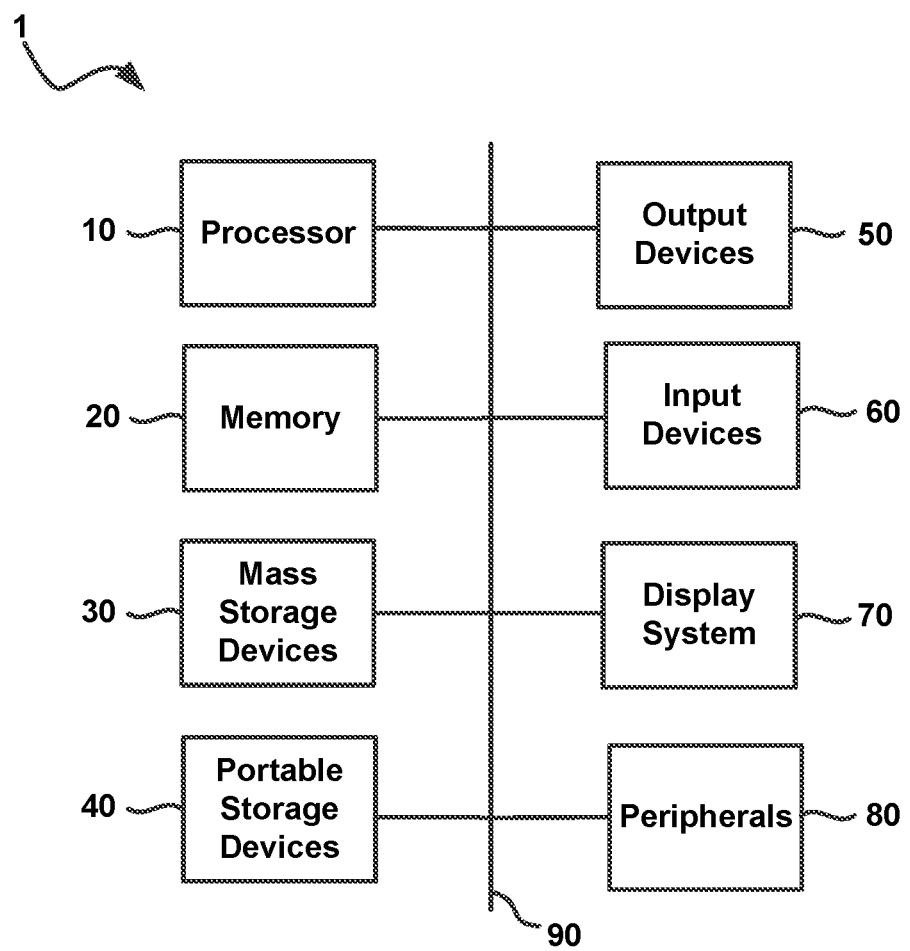
FIG. 9 is a schematic diagram of an example computing device that can be used to implement the present technology.

FIG. 9 illustrates an exemplary computing device 1 that is to implement an embodiment of the present systems and methods. The system 1 of FIG. 9 may be implemented in the contexts of the likes of the server 105 described herein. The computing device 1 of FIG. 9 includes a processor 10 and main memory 20. Main memory 20 stores, in part, instructions and data for execution by processor 10. Main memory 20 may store the executable code when in operation. The system 1 of FIG. 9 further includes a mass storage device 30, portable storage device 40, output devices 50, user input devices 60, a display system 70, and peripherals 80.

The components shown in FIG. 9 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 9. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys, or a scanner for reading bar codes. Additionally, the system 1 as shown in FIG. 9 includes output devices 50. Suitable output devices include speakers, label and receipt printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 9 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, PHP, MySQL, HTML, Java Script, CSS, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. An application delivery controller, comprising:
a processor; and
a memory for storing executable instructions, the processor being configured to execute the instructions to:
receive, from a client device, a SYN data packet intended for an application server;
determine, based on the SYN data packet, that the client device is a trusted source; and
based on the determination, transmit a SYN/ACK packet to the client device, the SYN/ACK packet comprising information for the client device to authenticate the client device to the application server directly as the trusted source, the information to authenticate the client device to the application server including at least server information preliminarily sent by the application server to the application delivery controller, the server information including at least transmission control protocol (TCP) options provided by the application server, the TCP options including at least a maximum segment size, a window scale, a selective ACK, and a timestamp.

2. The application delivery controller of claim 1, wherein the SYN data packet includes a request to establish a TCP session with the application server.

3. The application delivery controller of claim 2, wherein upon authentication of the client device to the application server directly as the trusted source, the client device returns the ACK data packet directly to the application server to establish the TCP session.

4. The application delivery controller of claim 1, wherein the processor is further configured to:
ascertain network capabilities of the application server; and
based on the determination that the client device is the trusted source, modify an Internet Protocol header of the SYN data packet according to the network capabilities of the application server.

5. The application delivery controller of claim 4, wherein the modifying the IP header of the SYN data packet includes adding an encoded value from an index table.

6. The application delivery controller of claim 1, wherein the determination that the client device is the trusted source includes determining that the client device is not a botnet.

7. The application delivery controller of claim 1, wherein the processor is further configured to perform at least one of compression, caching, connection multiplexing, application layer security, and content switching.

8. The application delivery controller of claim 1, wherein the processor is further configured to pass parameters from the SYN data packet to the application server to ensure compatibility of communications between the client device and the application server.

9. The application delivery controller of claim 8, wherein the parameters include at least one of sequence numbers, a source information, and a destination information.

10. The application delivery controller of claim 1, wherein the processor is further configured to:
collect application server information from the application server;
generate, based on the application server information, the information for the client device to authenticate the client device to the application server directly as the trusted source.

11. A method for secure network traffic transmission over an application session, the method comprising:
receiving, by an application delivery controller (ADC), from a client device, a SYN data packet intended for an application server;
determining, by the ADC, based on the SYN data packet, that the client device is a trusted source; and
based on the determination, transmitting, by the ADC, a SYN/ACK packet to the client device, the SYN/ACK packet comprising information for the client device to authenticate the client device to the application server directly as the trusted source, the information to authenticate the client device to the application server including at least server information preliminarily sent by the application server to the application delivery controller, the server information including at least transmission control protocol (TCP) options provided by the application server, the TCP options including at least a maximum segment size, a window scale, a selective ACK, and a timestamp.

12. The method of claim 11, wherein the SYN data packet includes a request to establish a TCP session with the application server.

13. The method of claim 12, wherein upon authentication of the client device to the application server directly as the trusted source, the client device returns the ACK data packet directly to the application server to establish the TCP session.

14. The method of claim 11, further comprising:
ascertaining, by the ADC, network capabilities of the application server; and
based on the determination that the client device is the trusted source, modifying, by the ADC, an Internet Protocol header of the SYN data packet according to the network capabilities of the application server.

15. The method of claim 14, wherein the modifying the IP header of the SYN data packet includes adding an encoded value from an index table.

16. The method of claim 11, wherein the determination that the client device is the trusted source includes determining that the client device is not a botnet.

17. The method of claim 11, wherein the ADC is configured to perform at least one of compression, caching, connection multiplexing, application layer security, and content switching.

18. The method of claim 11, wherein the ADC is configured to pass parameters from the SYN data packet to the application server to ensure compatibility of communications between the client device and the application server.

19. The method of claim 11, further comprising:
collecting, by the ADC, application server information from the application server;
generating, by the ADC, based on the application server information, the information for the client device to authenticate the client device to the application server directly as the trusted source.

20. An application delivery controller, comprising:
a processor; and
a memory for storing executable instructions, the processor being configured to execute the instructions to:
collect application server information from an application server;
receive, from a client device, a SYN data packet intended for the application server;
determine, based on the SYN data packet, that the client device is a trusted source;
generate, based on the application server information, information for the client device to authenticate the client device to the application server directly as the trusted source;
based on the determination, transmit a SYN/ACK packet to the client device, the SYN/ACK packet comprising the information for the client device to authenticate the client device to the application server directly as the trusted source;
ascertain network capabilities of the application server;
based on the determination that the client device is the trusted source, modify an Internet Protocol header of the SYN data packet according to the network capabilities of the application server; and
pass parameters from the SYN data packet to the application server to ensure compatibility of communications between the client device and the application server, the information to authenticate the client device to the application server including at least server information preliminarily sent by the application server to the application delivery controller, the server information including at least transmission control protocol (TCP) options provided by the application server, the TCP options including at least a maximum segment size, a window scale, a selective ACK, and a timestamp.

\* \* \* \* \*